United States Patent [19]
Miley et al.

[11] Patent Number: 6,121,569
[45] Date of Patent: Sep. 19, 2000

[54] PLASMA JET SOURCE USING AN INERTIAL ELECTROSTATIC CONFINEMENT DISCHARGE PLASMA

[76] Inventors: George H. Miley, 912 W. Armory Dr.; Yibin Gu, 2503 W. Springfield, both of Champaign, Ill. 61821; Blair P. Bromley, Apt. #22, 106 S. Coler, Urbana, Ill. 61801; Jonathan H. Nadler, 712 Bucks Lair Ct., Mt. Zion, Ill. 62549; John Sved, Falken Strasse 3, D-27755 Delmenhorst, Germany

[21] Appl. No.: 09/297,505

[22] PCT Filed: Oct. 31, 1997

[86] PCT No.: PCT/US97/19306

§ 371 Date: Aug. 4, 1999

§ 102(e) Date: Aug. 4, 1999

[87] PCT Pub. No.: WO98/19817

PCT Pub. Date: May 14, 1998

Related U.S. Application Data

[60] Provisional application No. 60/030,009, Nov. 1, 1996.

[51] Int. Cl.⁷ ............................. B23K 10/00; H01J 7/24
[52] U.S. Cl. ............................. 219/121.48; 219/121.54; 219/121.36; 60/202; 313/362.1; 313/359.1; 315/111.81
[58] Field of Search ................. 219/121.54, 121.48, 219/121.36, 121.43, 121.59; 315/111.31–111.81; 156/345; 60/202; 313/362.1, 359.1

[56] References Cited

U.S. PATENT DOCUMENTS

| | | | |
|---|---|---|---|
| 4,277,939 | 7/1981 | Hyman, Jr. | 60/202 |
| 4,639,642 | 1/1987 | Roberts et al. | 315/39 |
| 5,216,330 | 6/1993 | Ahonen | 315/111.51 |
| 5,352,954 | 10/1994 | Cirri | 315/111.21 |
| 5,947,421 | 9/1999 | Beattie et al. | 244/172 |

*Primary Examiner*—Mark Paschall
*Attorney, Agent, or Firm*—Sughrue, Mion, Zinn, Macpeak & Seas, PLLC

[57] ABSTRACT

An electrostatic ion jet source design, based on inertial electrostatic confinement technology. According to the invention, the inertial electrostatic confinement jet source employs a configuration that is compatible with the generation and acceleration of ions within a vacuum chamber. The device uses a unique spherical configuration, enlarged hole grid, channel guide grid and electron production/confinement method. The prior art designs have to produce a small diameter jet. Virtual cathode formation in a high-density region, combined with a locally distorted cathode grid potential field, extracts accelerated ions in an intense quasi-neutral ion jet. The device ejects matter with a jet form for use as an industrial plasma spray, industrial material processing, waste treatment, welding or cutting materials, or for plasma vapor deposition. The invention also concerns a device that can provide a propulsive thrust force for spacecraft propulsion, particularly an ion jet thruster, which uses an inertial electrostatic confinement design having a discharge plasma for generating ions that provide thrust when accelerated and expelled from the device in the plasma jet.

53 Claims, 11 Drawing Sheets

PLASMA JET SOURCE USING AN INERTIAL ELECTROSTATIC CONFINEMENT DISCHARGE PLASMA

This application claims domestic priority from U.S. Provisional Application SN 60/030,009 filed Nov. 1, 1996, and the entire content of that application is incorporated herein by reference.

BACKGROUND OF THE INVENTION

The present invention concerns a device, that uses ions or neutrally charged gas to provide a thrust force or stream of matter. In particular, invention concerns a device that ejects matter with a jet form for use as an industrial plasma spray, industrial material processing, waste treatment, welding or cutting materials, or for plasma vapor deposition. The invention also concerns a device that can provide a propulsive thrust force for spacecraft propulsion, particularly an ion jet thruster, which uses an inertial electrostatic confinement design having a discharge plasma for generating ions that provide thrust when accelerated and expelled from the device in the plasma jet.

There is a well known need for an intense source of hot ionized or neutrally charged gas in a variety of industrial applications, such as plasma sprays for cleaning or etching surfaces and as plasma sources for sputtering or vapor deposition. Such a source could also be valuable for a range of applications that require an intense heat source, such as waste treatment or materials cutting and welding.

In another application, designers of spacecraft, particularly commercial satellites such as those used for telecommunications, are especially concerned with the cost per unit of "commercial payload" that is provided by their design. Giving the limited capacity of expendable rockets and the "space shuttle", severe size and mass limitations are placed upon the spacecraft design. Accordingly, the "commercial payload" for a communication satellite, such as one that would be launched into geostationary orbit to provide voice, data and television services, would include equipment, such as antennas, transponders, signal processing and switching equipment, which directly provide the communications service. In order to maximize the profitability of a given spacecraft design, the "commercial payload" must be maximized in order to provide the largest amount of revenue-producing capability. Because the remainder of the satellite concerns "overhead" structures and equipment such as the spacecraft body, solar cells, power system, thermal control systems and orbit steering thrust systems, the goal of maximizing the income-producing payload requires that the overhead payload must be decreased. Of course, the trade-off between "commercial payload" and "overhead payload" is affected by the need for efficiency and long life in connection with the overhead services provided on board.

The orbit steering thrust system for a spacecraft is important because it may be utilized for at least two purposes. One purpose is the maintenance of the spacecraft in geostationary or low/medium altitude Earth orbit or interplanetary flight paths. The thrusters impart a change of momentum which changes the velocity vector at a pre-determined point or segment of the trajectory.

The other purpose of thrusters is the function of actuators of a system for the maintenance of the spacecraft attitude or orientation. In the vacuum of space reaction forces are achieved by momentum changes. The rocket or jet method is well understood in the field. A further application for the propulsion system is the injection of the spacecraft into orbit, a task typically accomplished by relatively high thrust chemical rocket engines. Depending upon the requirements of the propulsion system, the thrusters must operate within a desired power regime and provide a specific impulse level (i.e., impulse or force per unit of propellant mass consumed during a given time interval), level of efficiency and thrust suitable for its application. In the past, in addition to bi-propellant liquid and solid chemical rockets, conventional spacecraft propulsion systems have used monopropellant thrusters. Electrostatic ion thrusters also have been proposed for these purposes; however, to date, this technology has not proven to be sufficiently mature and reliable for commercial and scientific spacecraft applications.

The next-generation communication satellites will require alternative thrust systems that are a small fraction of the satellite mass. These thrusters must also operate in a low power range (200–700W), but must provide a moderate specific impulse (1000–3000s) and offer a thrust in the range of tens of milli-Newtons (mN). However, known electrical augmented thruster designs, such as arc-jet and resisto-jet thrusters, do not operate well at power levels below 1 Kw. Pulsed magnetoplasmadynamic (MPD) thrusters using plastics or other solid propellants have low efficiencies, typically under 30%, making them incompatible with the goal of reducing the spacecraft overhead payload mass. Although some progress is being made in the development of electrostatic ion thrusters, particularly those having a planar design, there are concerns about their efficiency and, more importantly, the lifetimes of lower power units. A particular problem with such thrusters is the erosion of electrical grids during operation.

Conventional planar ion thrusters use magnetic fields to confine the electrons used for ionizing the neutral propellant atoms. Aside from the present ion jet concept, no other thruster concept known to date is spherical, nor does any other thruster use an electron guide grid to oscillate electrons for the purpose of ion generation. Previous patents of interest, but of remote relationship to the present concept, include John P. Brophy's 3-grid accelerator system for an ion propulsion engine (U.S. Pat. No. 5,369,953), J. R. Kaufman's original electron bombardment thruster concept (U.S. Pat. No. 3,156,090), and R. Boyer and J. P. Journoux's gas ionization chamber concept (U.S. Pat. No. 4,468,564).

Accordingly, it is an object of the present invention to provide a design for an ion thruster which will reduce grid erosion and significantly increase thruster lifetime.

It is another object of the present invention to provide a hot ionized or neutrally shaped gas source design which is compact, providing a greater weight reduction advantage.

Another object of the present invention is to reduce neutral propellant gas leakage, thereby saving propellant and further reducing mass.

In addition, it is an object of the present invention to provide a design for a source of hot ionized gas or neutrally charged gas for industrial applications where plasma spray, vapor deposition, or intense plasma heating is desired.

SUMMARY OF THE INVENTION

The present invention is an electrostatic ion jet source design, based on inertial electrostatic confinement (IEC) technology. According to the invention, the inertial electrostatic confinement jet source employs a configuration that is compatible with the generation and acceleration of ions within a vacuum chamber. Virtual cathode formation in a high-density region, combined with a locally distorted cathode grid potential field, extracts accelerated ions in an intense quasi-neutral ion jet.

In a particular embodiment of the present invention, the jet source employs a spherical configuration wherein ions are generated and accelerated towards a core at the center of an electrically grounded spherical vacuum chamber. A gaseous propellant is introduced into the chamber at appropriate locations around the vessel. Within the vessel, a first wire grid (preferably a spherical cathode wire grid) having a high geometric transparency (preferably>90%), and being designed to provide an exceedingly high effective transparency (preferably 98–99%), is positioned at the center core region of the vessel. "Effective transparency" is defined as the probability of ions passing through a grid in the case where the flowing ion beam profile is non-uniform. In the present case, ions are concentrated in channels ("microchannels") passing near the center of the grid opening, decreasing the chance of interception and increasing the effective transparency over the primary geometric transparency of the grid. Between the first wire grid and the vessel wall is a second, positively charged outer electrical grid positioned near the grounded sphere. It has the function of an electron guide grid which increases the path length of electrons and enhances the ionization rate of the background neutral gas into plasma. A negative potential is placed on the inner grid to provide an appropriate electric field for ionizing the gas. The field, in combination with electrons from emitters disposed within the sphere, will cause the generation of ions within the sphere and the formation of the ions into "microchannels". These microchannels of ions may be directed by the spherical grid to focus at the center of the chamber and grid. A third cylindrically shaped grid, which is located between the inner cathode grid and outer anode grid and ground wall, and forms a path to a hole in the wall of the sphere, will define the path for the expulsion of ions from the thruster.

The invention further comprises an auxiliary "channel" grid design which uses a cylindrical vessel having a longitudinal axis along which ions are directed for ejection from the vessel.

The invention further comprises an IEC device of a spherical, cylindrical or other design geometry, having grid-like electrodes which are biased at a potential sufficient to generate and accelerate ions. The device includes a channel grid which creates a channel in the electrostatic potential through which ions may escape at maximum kinetic energy.

A further feature of the IEC plasma jet device is that it may have two configurations for ion/plasma generation. The first configuration employs only a simple plasma glow discharge between the outer ground sphere and the negatively-biased inner spherical cathode wire grid. Electrons impact the background neutral gas throughout the discharge region between the cathode grid and the ground wall, creating ions which are then accelerated by the cathode grid to the core of the device. The second configuration for ion generation employs an additional spherical wire grid that is larger in diameter than the cathode grid and which is situated between the cathode grid and the ground wall, but it is closer to the ground wall. Electron emitters, such as heated thoriated wires, are spaced around the ground wall. The additional spherical wire grid also has a high geometric transparency (>90%), and it is biased to a positive voltage (100 to 1000 V). This outer anode grid is an electron guide grid which helps to re-circulate and confine the majority of electrons created by the emitters in a thin spherical volume localized around the guide grid, thus helping to maximize and localize the ionization of the background neutral gas and the generation of ions in this volume, close to the ground wall. The electron guide grid, in combination with electron emitters, improves the ionization efficiency of the IEC plasma jet device, and since the ion generation is more localized, the accelerated ions that reach the core have a more mono-energetic distribution. These features improve the thrust and efficiency of the plasma thruster, and allow more control over the jet for plasma processing.

A further feature of the invention is to use Xenon or similar propellant gas which is bled into the device through holes disposed at strategic locations around the chamber outer wall so as to maximize propellant ionization and minimize neutral gas atom loss.

Yet another feature is that DC or pulsed DC or AC electrical power may be used as an input. All of these types of input power will produce thrust, constant or proportional to the DC power input, pulsed in synchronization with the single or repetitive pulsed input power or pulsed in synchronization with the AC input power at the corresponding frequency.

A further feature of the invention is to use a carbon rich gas, such as methane, in combination with other buffer gas, such as Argon or Xenon, which is bled into the device through holes disposed at strategic locations around the chamber outer wall. The ionization and confinement conditions may be selected to produce Fullerene species of carbon molecules, such as Carbon 60. These very high molecular weight molecules are desirable as propellants in ion rocket motors because the momentum change or thrust is much improved. The specific impulse will be improved. The gaseous or even liquid methane propellant can be relatively easily stored on the space vehicle.

Another feature of the invention is to use nitrogen gas as the propellant. Although such a propellant would not offer the highest specific impulse, it may be preferred when great quantities of atmospheric air are scooped by a low Earth orbit liquid oxygen collector satellite. The by-product is liquid nitrogen. The use of the nitrogen would be necessary to compensate for the steady deceleration force of atmospheric drag. A battery of IEC jet rocket motors may provide the drag compensation thrust.

Another feature of the invention when it is applied to industrial plasma spray processes is that the propellant gas may be utilized as a carrier or buffer for other materials such as metals. Such metals would be introduced into the chamber by the gas stream in microscopic particulate form. Ionization of the metallic particles would render the metal to individual metal atoms or ions. The metal ion spray would be aimed at the targets which would typically be plastic or metal components that would become coated. The resulting highly specular coatings are commonly seen on "metalized or metal coated plastic components and base metal "chromed" bathroom fittings. Such Plasma Vapor Deposition (PVD) processes are well known in the appropriate industries where they have replaced electrochemical metal coating processes. Manufacturers of such PVD facilities have expressed a requirement for more efficient and cost effective plasma spray generators. The IEC jet may be readily adapted for this range of applications.

Another feature of the invention is that the kinetic energy of the plasma or neutral jet may be controlled so that a degree of penetration of the particles into a target material may be consistently reproduced. Such operation could provide unique identical cutting, or when used for local heating, welding or cutting operations. Another related application that would employ the heating-melting capability of the plasma jet would be treatment of wastes. For example, various organic waste impregnated in soils could be heated, decomposed, and the products driven off as vapors for subsequent disposal. Various industrial as well as research tool applications would be evolved as derivatives of the IEC jet invention.

In summary, the IEC jet source is unique as a spherical device with its special enlarged hole grid for forming the jet, the use of electron emitters and an electron guide grid to oscillate electrons in an outer ionization region to serve as the ion source, and the use of a cylindrical guide channel grid to aid the jet flow out of the spherical grid region.

While prior art designs have the common feature of production of ions by electron-induced ionization, none use the unique spherical configuration, enlarged hole grid, channel guide grid and electron production/confinement method employed in the present IEC jet source device. The prior art designs have resulted in broad area plasma flow, as opposed to the small diameter jet that results from the present invention.

DESCRIPTION OF THE PREFERRED EMBODIMENTS

An IEC particle generator is described in U.S. patent application Ser. No. 08/232,764 (Miley et al.) which was filed on Apr. 25, 1994 and is incorporated herein by reference. The inertial electrostatic confinement device disclosed therein includes a vacuum vessel which is held at ground potential and contains internally and concentric to the vessel, a wire grid which acts as a cathode. The cathode may be made from a variety of metals having structural strength and appropriate secondary electron and thermionic electron coefficients. The cathode wire grid is connected to a power source to provide a high negative potential (30 kV–150 Kv), while the vessel itself is conductive and maintained at a ground potential. Deuterium (D) or a mixture of deuterium and tritium (T) or helium-3 (He-3) gas is introduced into the vessel. A voltage is applied to the cathode wire grid and the pressure is adjusted in order initiate a glow discharge. To maximize the neutron yield per unit power input, while maximizing grid lifetime by reducing ion collisions with a grid, operational conditions are used to create a "star" glow discharge mode. The glow discharge generates ions in the discharge region between the grid and vessel wall. Ions thus formed are extracted from the discharge by the electric field created by the cathode grid. This electric field accelerates the extracted ions through the grid openings and focuses them in a small spherical region (forming a "plasma core") at a spot in the center of the spherical device. The resulting high-energy ions interact with the background gas (beam-background reactions) and themselves (beam-beam reactions) in the plasma core, resulting in a high rate of fusion reactions. The result is a neutron generator producing neutrons as one of the D-D or D-T fusion reaction products. Where the ejection rates are high, the injected ions may provide a strong local positive potential region that then attracts and accelerates electrons towards the plasma core. The electrons in turn generate a strong local negative potential well at the center region of the positive ion generated potential. This structure, termed a "double potential well", traps and confines beam ions, creating even higher reaction rates. The device may be modified by using a gas mixture of D and He-3 to be a source of fusion-produced protons as well as neutrons.

Figure 1:
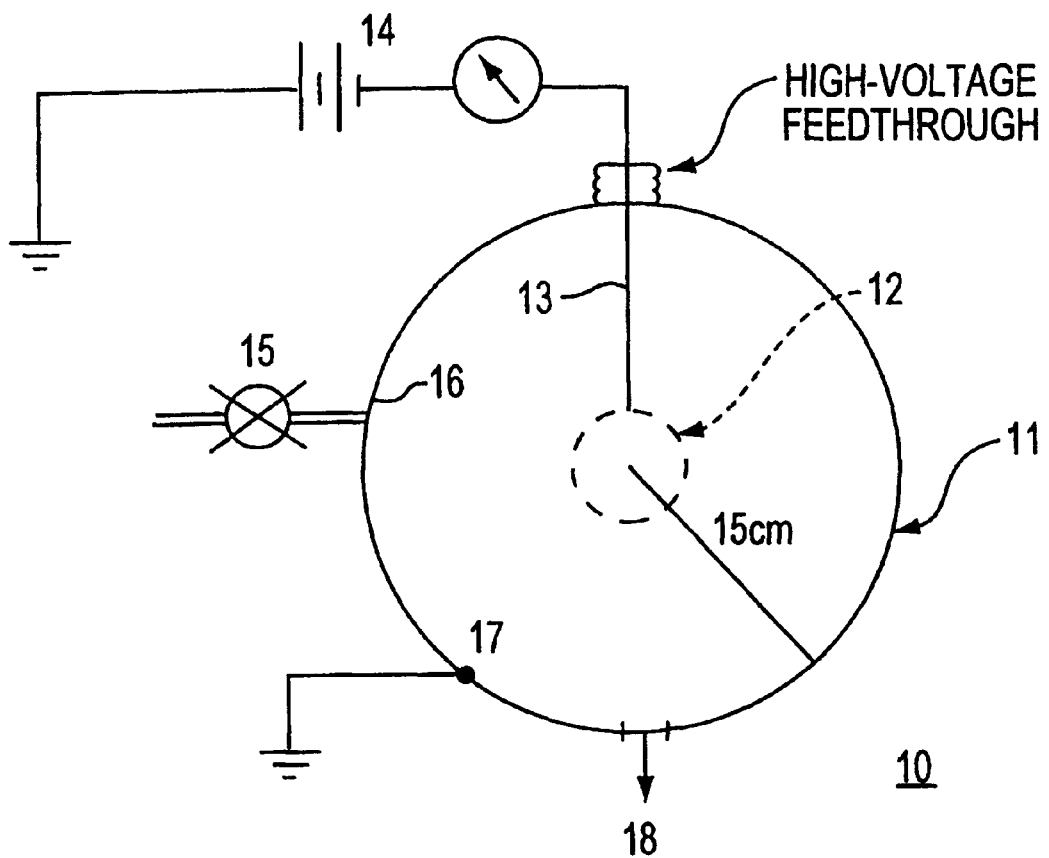
FIG. 1 is a schematic diagram of an inertial electrostatic confinement (IEC) neutron/proton generator, which is the subject of co-pending application Ser. No. 08/232,764.

One geometrical form of the device is spherical and is seen in FIG. 1. This device may be broadly viewed as an ion accelerator with a plasma target. In a neutron-generator embodiment, deuterium-deuterium or deuterium-tritium fusion reaction takes place in the plasma target and produce energetic neutrons. The device acts as a simple spherical plasma diode, having a ground potential on the outer sphere and a negative potential on a nearly geometrically transparent inner spherical grid. The spherical inertial electrostatic confinement device 10 is illustrated in FIG. 1, where a conductive vacuum chamber 11 is connected to a ground potential at contact 17. The device has a cathode grid 12 which defines a small sphere within the chamber and has a grid design that provides a high geometric transparency. In operation, however, this grid design has an even higher effective transparency, due to the effect of a concentration of ions into "microchannels", as subsequently described. A source of electrical power 14 is connected by a high voltage electrical feed-through to the internal cathode grid 12. The voltage has a negative value, thereby providing a bias between the relatively positive walls of the vacuum chamber and the central grid area. Gas is introduced into the vacuum chamber 11 by a control valve 15 and is evacuated by a pump 18. Other gas storage and pressure regulation such as getter pumps which are well known may be utilized depending on the specific functional and utilization requirements of an IEC device.

Upon application of a potential to the cathode grid, for certain grid-configuration designs, combined with appropriate grid-voltage, gas pressure and gas type, high-density ions and electron beams will form within the IEC device initiating a "star" mode of operation. In this mode, high-density, space-charged neutralized ion beams are formed into microchannels that pass through the open spaces between the grid wires. As the ions avoid contact with the wires, this mode increases the effective grid transparency to a level above the geometric value. Thus, these microchannels significantly reduce grid bombardment and erosion and increase power efficiency. For conventional star mode operation, the grid and microchannel beams are symmetric so that a convergent high-density core develops. In this configuration, the IEC device serves as a valuable source of neutrons or protons.

The basic principles of the IEC device have been extended to the generation and channeling of a plasma jet out of an opening in the vacuum vessel in order to create a thrust. It has been determined that by enlarging at least one of the grid openings, a very intense, tightly coupled space-charge neutralized plasma jet will be created and directed outward from the central core plasma region. The jet formation is the result of a large distortion of the electric potential surface at the enlarged grid opening. The resulting local potential gradient initiates electron flow which then drags ions out across the surface. The result is the formation of an intense space charge neutralized beam at that location.

The IEC thruster produces ions in the gas discharge region through the ejection and oscillation of electrons about a guide grid that is held at a slightly positive voltage. A central negative grid extracts ions from the discharge region and accelerates them towards the center of the device. The "Tstar" mode, when initiated within the IEC thruster vessel, confines accelerated ions until they are diverted out through the plasma jet opening. With this approach, a majority of ions are able to escape the core region through the plasma jet at full acceleration. Thus, the local potential gradient perturbed "star" mode provides an efficient method to store and direct energetic ions.

Figure 2:
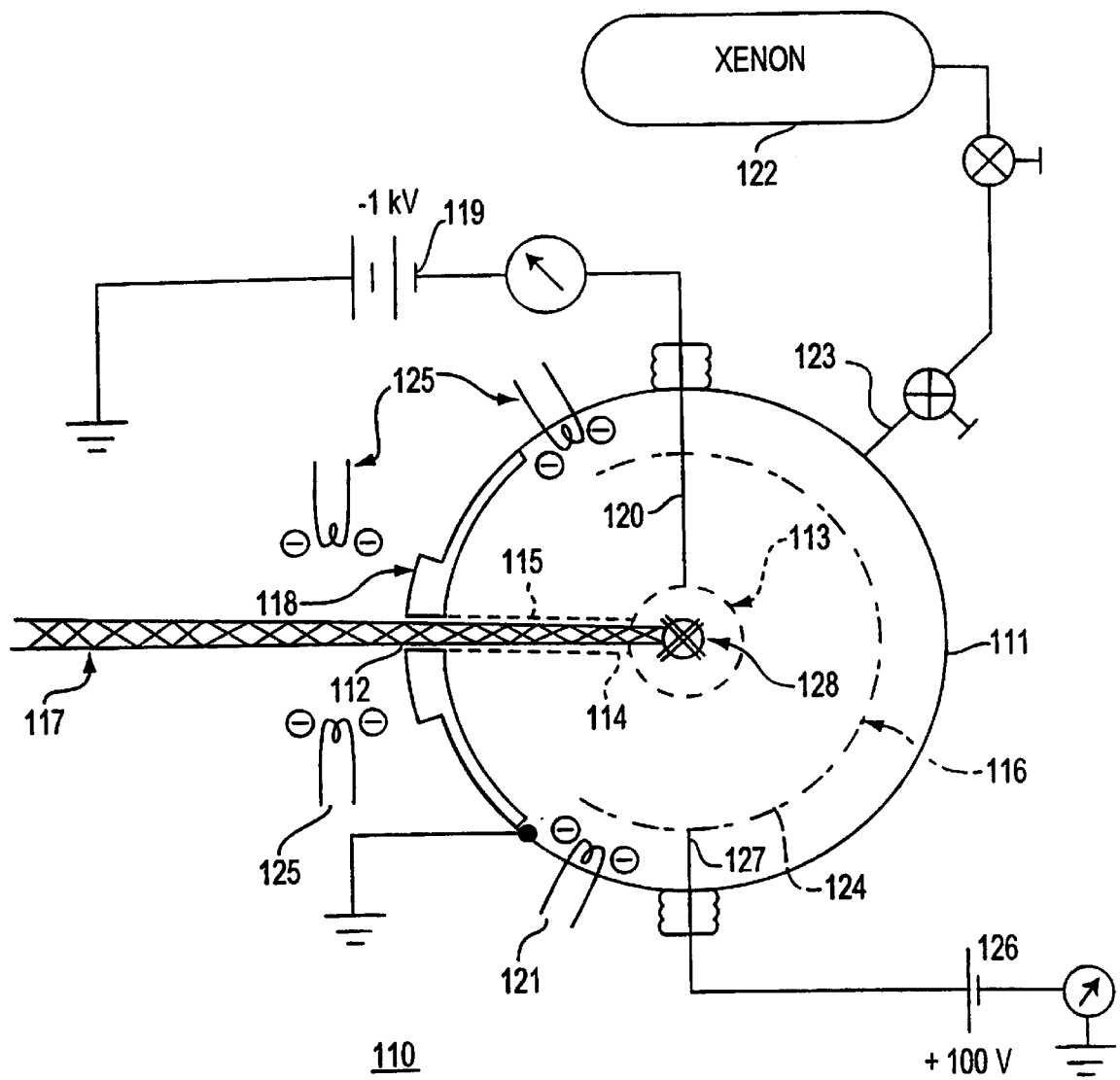
FIG. 2 is a schematic design for an IEC jet source, which is the subject of the present invention.
Figure 3:
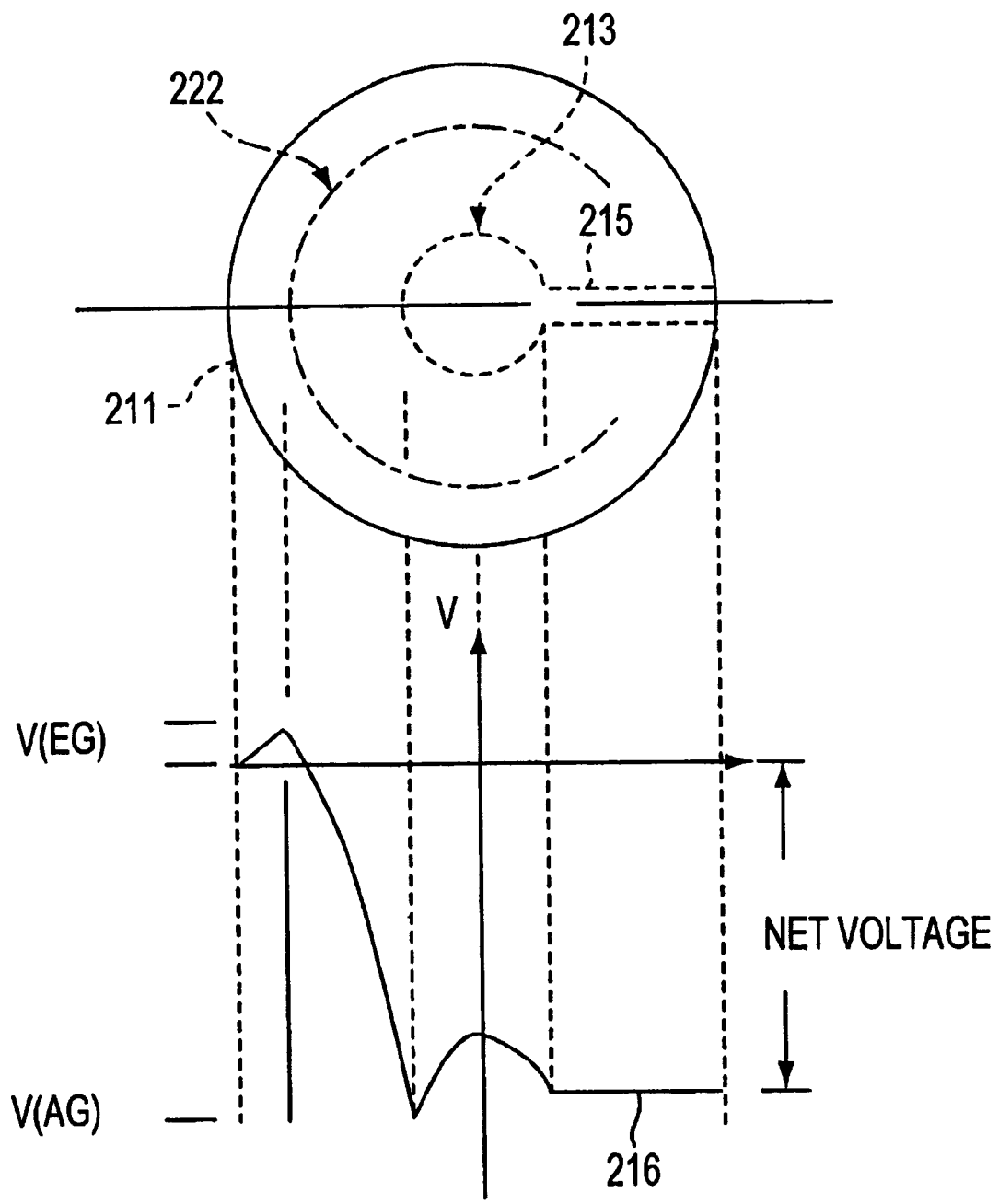
FIG. 3 is an illustration of the electrical potential along a thrust axis of the IEC jet source.

The design of an IEC jet source is shown in FIG. 2. The source 110 is comprised of a spherical vacuum chamber 111 with a small hole 112 formed in one side. A spherical electrode grid 113 constructed of wire or vanes with their planar axes intersecting at the spherical electrode centroid, which are made of high temperature, high electron emissive material such as tungsten or tantalum, has a geometric transparency of greater than 90%, is mounted inside the chamber. The grid also may be formed of a plurality of vanes joined together in a geometric pattern that provides a thin profile when viewed in a radial direction in order to achieve a high geometric transparency. The grid serves to define a central volume that confines a plasma, formed of generated ions, and provides an ion stream that becomes the plasma jet. A second hole 114, approximately the same size as the first hole, is formed in the side of the wire grid 113. This hole 114 is aligned with the hole 112 in the chamber wall and is connected to it by a cylindrical "guide" grid 115 having a diameter similar to that of the two holes. The cylindrical grid 115 creates a channel in the electrostatic potential distribution, through which ions can escape at their maximum kinetic energy in a jet 117. The electrostatic potential variation is shown in FIG. 3. An insulator 118 covers the grounded wall of the chamber 111 and must be sized to prevent arc-over from the grounded vessel wall to the cylindrical grid 115. As seen in the Figure, this high-voltage insulator has a spherical shape and covers the outer ground wall in the region near the hole through which the plasma jet exits the device. The high-voltage insulator also lines the inside of the hole 112 through which the plasma jet passes. The insulator maintains the electric potential difference between the negatively biased cylindrical grid cathode, the outer ground sphere and the electron guide grid. The device also uses insulated support structures to hold the electron guide grid, spherical cathode, and cylindrical grids in place. Inner electrical grids 113 are connected to a power supply 119 through an insulated feed through cable 120. The cable and connectors (unnumbered) comprise a high-voltage feed-through insulator systems which allows electrical power at a high negative voltage to be sent to the inner cathode 113, and electrical power at a low positive voltage to be sent to the electron guide grid 116. A positively charged outer electrical grid 116, which is connected to a power supply 126 (for example, 10–1000 V) and is positioned to be concentric with and near the grounded sphere 111, in combination with electron emitters 121, will generate ions. The intermediate spherical grid-like structure 116, which lies between the inner cathode and the outer ground sphere, is highly transparent to ion and electron flow and is biased to a voltage positive relative to the ground sphere potential. This structure is an electron guide grid which effectively increases the path length of electrons and enhances the ionization rate of the background neutral gas into plasma. As seen in FIG. 3, the sphere of the electron guide grid does not extend over the entire device. A section of the electron guide grid is cut out near the plasma jet hole through which the plasma jet escapes the device. The voltage on the outer grid 116 must be selected to optimize ion generation, and may be in a range of –0.1 kV to –30 kV, and may operate with an electrical current of 0.005 to 2,000 amps. The accelerating voltage must be kept at a level (e.g., 1 kV) to ensure that the resultant exhaust velocity will be close to a desired level (e.g., 30,000 m/s, where the specific impulse is less than 3,000 seconds). A gaseous propellant 122, which may be xenon or other comparable material, is bled into the chamber through holes 123 at appropriate locations around the wall of the vessel 111. The presence of a neutral gaseous propellant in the chamber will be maintained at a gas propellant pressure between 0.1 and 20 mTorr. The entire gas-feed and ionization system will be optimized to minimize the loss of neutral propellant during operation. The key issue is to ensure that the plasma jet substantially fills the vacuum vessel opening used for its escape. In that way, leakage of neutral atoms around the edges of the jet is greatly reduced. Electron emitters 125 are attached close to the jet discharge hole 114 to ensure complete neutralization. Additional electron emitters are situated on the inside of the device, attached to the outer ground sphere, with the emitter coils/guns positioned in the space between the wall of the outer sphere and the electron guide grid 116.

As seen in FIG. 2, a central core 128 is the location of highest concentration of the ions and acts as the source for the plasma jet 117 that is emitted by the source.

FIG. 3 illustrates the electric potential along the IEC thrust axis. It can be seen, moving from left to right in the figure, that the voltage is at the vessel wall 211, due to its connection to ground, and rises as it approaches the positively biased electron guide 222. However, further movement toward the center of the device will show a sharp reduction in the voltage towards a minimum at the negatively biased accelerating grid voltage V (AG). Within the center of accelerating grid, the voltage again becomes positive, peaking at the center and falling off to a steady state level along the plasma jet path 216 within the cylindrical grid 215. Potential well theory predicts formation of a second virtual cathode at high ion currents.

The IEC source that has been disclosed would use a propellant comprising xenon, having a molecular weight of 131.3 amu. This gas is selected because of its relatively high mass combined with its ease of ionization, but substitute gases such as cesium, argon, hydrogen, helium, methane, deuterium, and even nitrogen may also be used. Where a carbon-based gas such as methane is used, the jet may contain microparticles, such as fullerenes. As seen in FIG. 2, the vessel 111 itself may be made of a conductive material such as stainless steel, while the electron guide 116, the accelerating grid 114 and the cylindrical grid guide 115 may be made of materials such as stainless steel, tantalum, tungsten molybdenum or vanadium having characteristics such as high melting point, high secondary electron coefficient, low electrical resistivity, high thermal conductivity and low sputtering yield. Non-conductive vessel materials also may be used, but additional grids are required.

On the basis of a −1 kV source 119 and a +100 V source 126, the device may develop a specific impulse of 3,000 s with a thrust of 34 mN and a jet power of 500 W. With these voltage values, the net accelerating potential would be approximately 600 V with a beam current of approximately 800 mA and an input of approximately 750–800 W. Evidencing the large effective transparency, the power loss to the grid is less 50 W and the power loss to propellant ionization is approximately 200–250 W. As a result, the overall thruster efficiency would be approximately 60–70%. Because the IEC device has a much greater effective transparency than planar electrostatic ion sources or thrusters, due to the coarseness of the grid wire or vane spacing and the formation of microchannels, the power loss to the electrical grids is lower, even with multiple ion circulations through the IEC device before expulsion through the jet. The IEC device will have higher densities and temperatures in the central core plasma than those that are encountered in planar thrusters, but the corresponding increase in radiation losses due to the higher bremsstrahlung rates under these conditions will still be negligible. Thermal radiation losses are expected to be comparable to those of planar plasma devices. In the IEC thruster, ions and electrons are recirculated before being ejected, and the ionization region is more effectively localized with the multiple grid system, providing better efficiency for the energy expended per full-speed exhaust ion. In consideration of these factors, the energy expenditure per ion (power loss from ionization of the propellant) is less than the estimated 300 eV per ion for planar thrusters.

Figure 4:
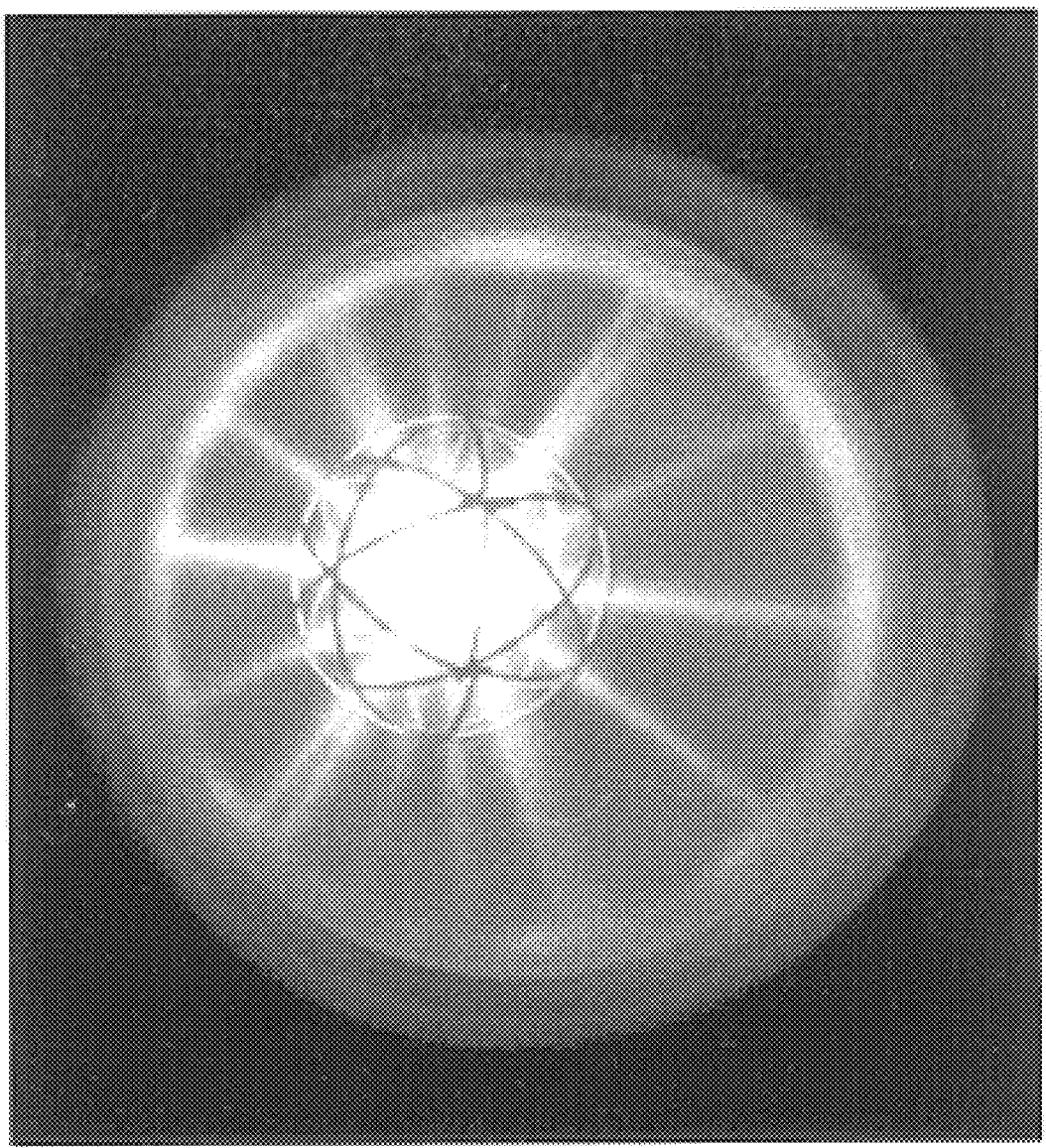
FIG. 4 is an illustration of the star mode for an IEC jet source showing microchannels developed during operation.

FIG. 4 is an illustration of the star mode which is present in an IEC device. This illustration shows the development of microchannels through the central grid openings, the microchannels extending from the central core region through the grid to the vessel walls.

The combination of pressure, volume and current parameters, and grid design will give sufficient local perturbation of the electric field so as to cause ions to deflect into channels. Such perturbations are achieved by a grid hole size that provides openings which cover a significantly larger portion of the total area of the grid sphere. Self-field forces further aid in constricting and maintaining the ion beams. As explained in the above referenced pending applications, for the spherical design, the ratio of the height of the grid opening surface of the sphere surface and sphere radius $R_c$ determines the degree of depression of the potential surface, in turn causing beam formation.

Figure 5:
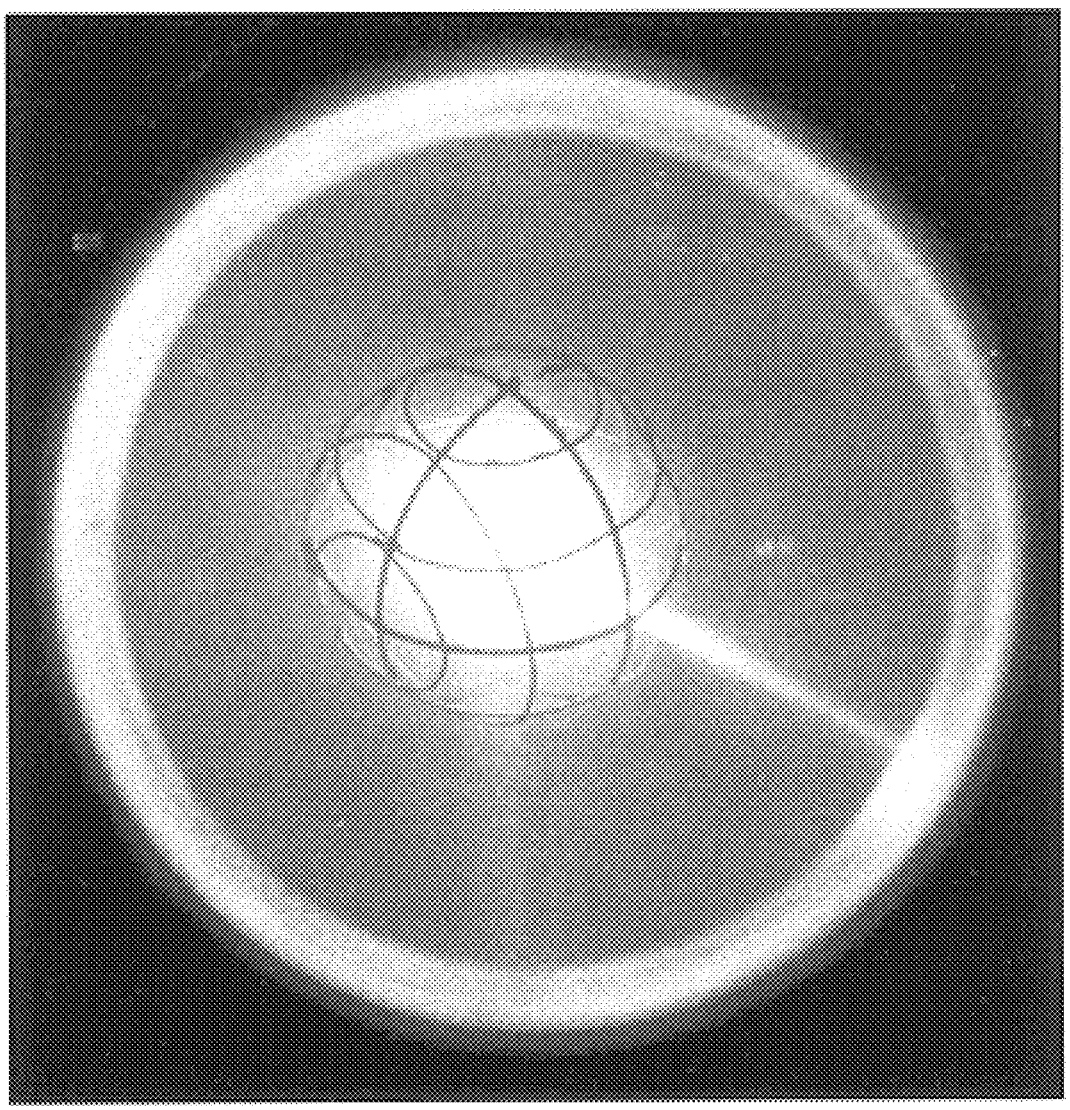
FIG. 5 is an illustration of the IEC thruster operating in a jet mode with a focus beam.

FIG. 5 is a photograph that illustrates a plasma jet formed in a device having an IEC thruster configuration. The multiple microchannels are only faintly visible, while the plasma jet is focused through the spherical grid region from the central core to the vacuum chamber wall of the vessel. Provision of an appropriate opening in the chamber wall would permit a flow of the jet outside of the vessel to provide a thrust. Such operation is easily done in space where an external vacuum naturally exists, but on earth, a mechanism to prevent back flow of air into the jet would be required.

Figure 6:
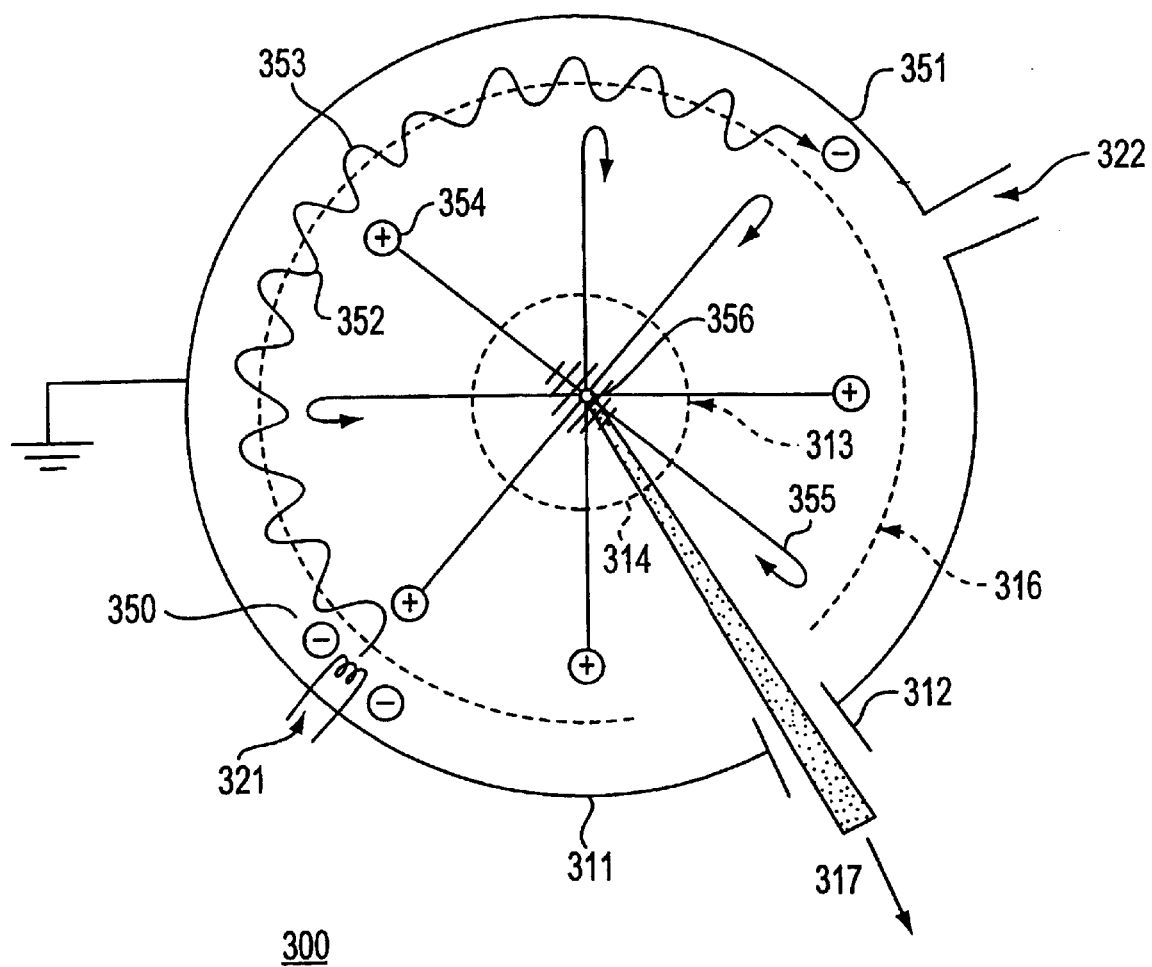
FIG. 6 is an illustration of an ionization process in an IEC jet source.

FIG. 6 is a photograph that illustrates the ionization process in an IEC thruster 300. The thruster comprises a grounded vessel 311 which has an opening 322 for insertion of a propellant gas and an exit port 312 for the projection of a plasma jet 317. A spherical negative acceleration grid 313 is provided at the center of the vessel while a positive grid electron guide 316 is disposed concentrically around the negative acceleration grid, close to the vessel wall. The cylindrical guide grid is not shown for ease of illustration. In operation, an electron emitter 321 will generate electrons which flow along the positive grid electron guide from source locations 350 to intermediate points 351 along the guide. As the electrons flow along the guide, they will oscillate as a result of the action of the voltages and will produce positive ions 354, via ionization collisions with the background gas. The ionized particles 354 will flow under control of the internal field created by the two grids through the center 356 of the vessel. The positive ions return to a potential surface corresponding to the potential value at their point of birth. At that point, all of their kinetic energy has been transformed to potential energy. Thus, their motion stops and they reverse direction, being accelerated back towards the center of the vessel. Then, they return again to the center of the vessel for further action.

The design for the inertial electrostatic confinement source is not limited to a spherical design, but may have a cylindrical, elliptical or other design. The cylindrical design is based upon the use of a plasma target created at the center of the chamber by the intersection of multiple ion beams. Using other geometric designs, such as cylindrical designs, a similar approach to the creation of ion streams and the deflection of the ions into a thrusting plasma jet would provide a similar result. Such designs would promise good efficiency, low weight and, due to very open accelerator grid structure, a long lifetime. Any viable source of on-board stored, collected or generated electric power may be conditioned to provide the required voltages and currents.

Several preferred embodiments of the IEC ion source have been defined. For example, the apparatus for producing a single narrow plasma jet may be a 32-cm diameter vacuum chamber having therein a 5-cm diameter grid comprised of a hexagonal hole with diameter 2.5 cm, 12 equilateral triangles with 2.5-cm sides, and 12 equilateral triangles with 1.5-cm sides, 3 to 5 millitorr Argon gas chamber pressure, 1 to 3 kV grid voltage, and 1 to 60 mA electrode current. The single narrow plasma jet emerges through the hexagonal hole in the grid. Alternatively, the hole may be diamond shaped by removing one structural element from between two adjacent triangular grid holes.

Another embodiment comprises a 31-cm diameter vacuum chamber having therein a 7.5-cm diameter electrical grid. The grid pattern involves a pattern of circuit holes of average diameter about 0.9-cm, but with one 1.8-cm diameter enlarged circular hole. A 10 to 20 mA electrode current and 1 to 5 kV are applied to create a single narrow plasma jet which emerges through the enlarged circular hole in the grid.

As a variation of the first two designs, multiple plasma jets can be simultaneously created by employing multiple enlarged grid openings (hexagonal or circular) in the grid pattern. The number and direction of the multiple jets are determined by the number and location on the grid pattern of the enlarged openings.

Thus, a further design produces six individual narrow plasma jets with the following design configuration and operational conditions. Specifically, there is a 31-cm diameter vacuum chamber, a 3-ring ellipsoid electrical grid with a 6-cm minor axis and 8-cm major axis with a geometric transparency of 95%, 1 to 10 millitorr Argon gas chamber pressure, 20–30 kV grid voltage and 5–15 Ma electrode current.

As another multi-jet example, the apparatus can be configured to produce one dominant jet and a minor diametrically opposed jet under the following design configuration and operating conditions. Within the spherical vacuum chamber is a grid consisting of 7 rings of 0.2-mm thick 35-mm O.D. 29-mm I.D. assembled to create a spherical grid with 3 rings that intersect at the north and south poles. The remaining 4 rings are arranged to establish a recurring uniform pattern of triangular holes. The anode chamber wall has a 230-mm inside diameter. A $7-9\times10^{-}$m bar pressure of gas is provided in the chamber, with current of 10–40 mA, and a voltage of 5–15 kV. The jet exits via the largest triangular hole.

To the extent that the foregoing description has been applied to the ion rocket motor application, the IEC JET may be configured similarly for industrial applications. For such applications, the IEC jet source unit would be accommodated within a larger volume vacuum vessel that would also accommodate the target or targets to which the plasma or neutral particle jet would be applied. The IEC jet unit may be fixed in one position and the targets moved into the jet strike zone or the IEC jet unit may be moved by robotic actuators to spray coat the targets which would be mounted for optimal coating quality.

Figure 7:
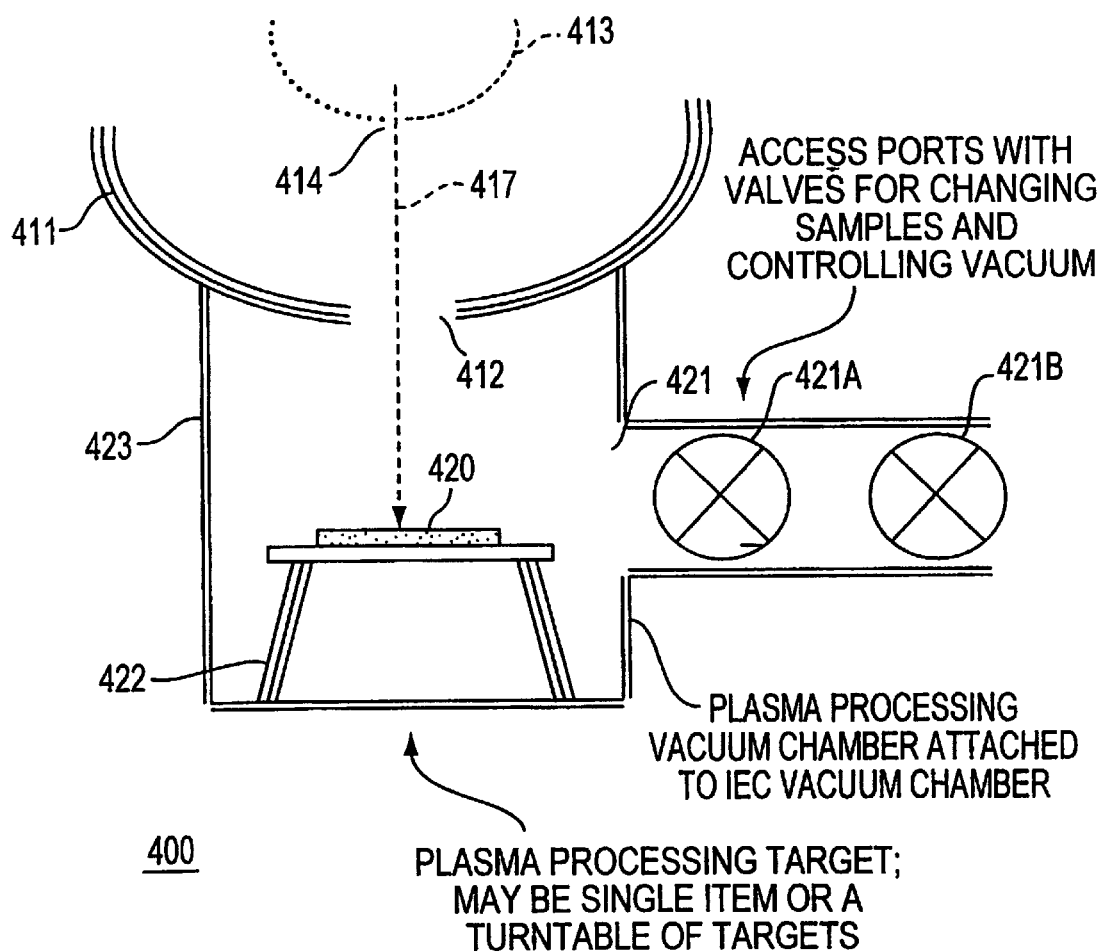
FIG. 7 is an illustration of the IEC jet being used for plasma processing of a single stationary target.

In particular the use of the IEC plasma jet for industrial and scientific applications, where a plasma spray, vapor deposition, or intense plasma heating is required, is exemplified in FIG. 7, which is an illustration of the IEC plasma jet 417 being used for plasma processing of a single stationary target. A single target 420, or an array of targets set upon a rotating turntable 422 are placed in a large vacuum chamber 423 attached to the main IEC device vacuum chamber 411. The IEC plasma jet 417 first passes through a hole 414 in grid 413 and then through hole 412 in the IEC vacuum chamber wall 411 and hits the target. Multiple access ports 421 are situated about the plasma processing chamber 423 for changing out the plasma targets. Valves (e.g., 421A, 421B) are used on some of the access ports for controlling the vacuum of the plasma processing chamber.

Figure 8:
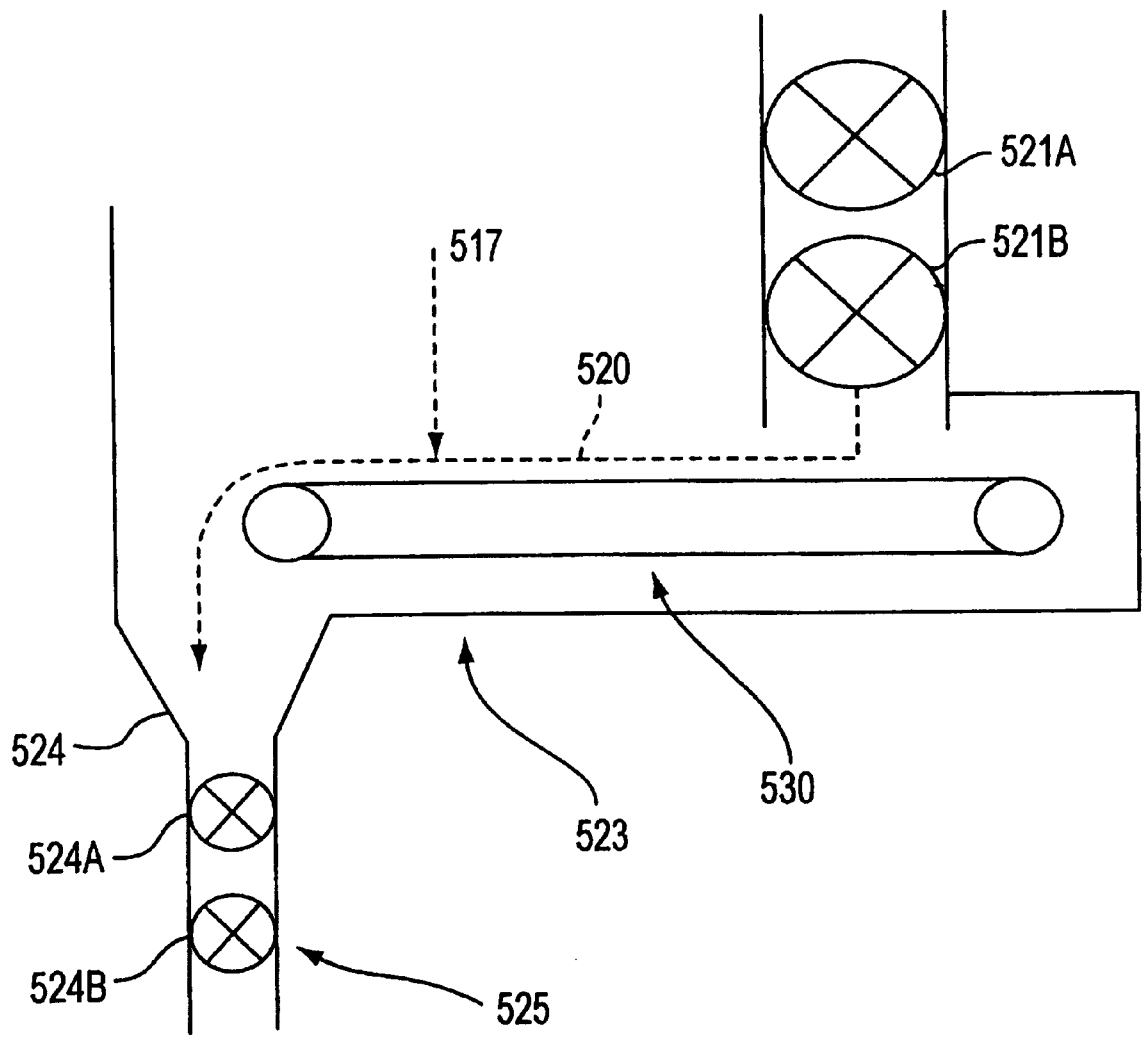
FIG. 8 is an illustration of the IEC jet being used for continual plasma processing of multiple targets being transported using a system of access ports, control valves, and a conveyor belt.

FIG. 8 is an illustration of an alternative 5 concept for using the IEC jet for plasma processing. This concept will allow continual plasma processing of multiple targets. A large plasma processing vacuum chamber 523 is attached to the main IEC device vacuum chamber. Targets 520 are fed in through an access port 521 with at least two vacuum control valves 521A, 521B. The targets are fed on to a conveyor belt system 530 which moves the them along in front of the IEC plasma jet 517 for processing. Treated targets are transported to another access port 524 with multiple vacuum control valves 524A, 524B where they can be removed from the system. This system is more complicated than the one described in FIG. 7, but it does allow relatively continuous processing of plasma targets. Additional ports can be placed on the plasma processing chamber for performing visual/optical inspection and/or X-ray, or gamma-ray diagnostics of the completed plasma targets before removal from the plasma processing chamber (not shown but similar to 521 and 524).

For other applications such as plasma spraying or etching, the IEC jet unit could be located within a commercial spray or etch unit. The jet would be directed as desired on the target material.

Figure 9:
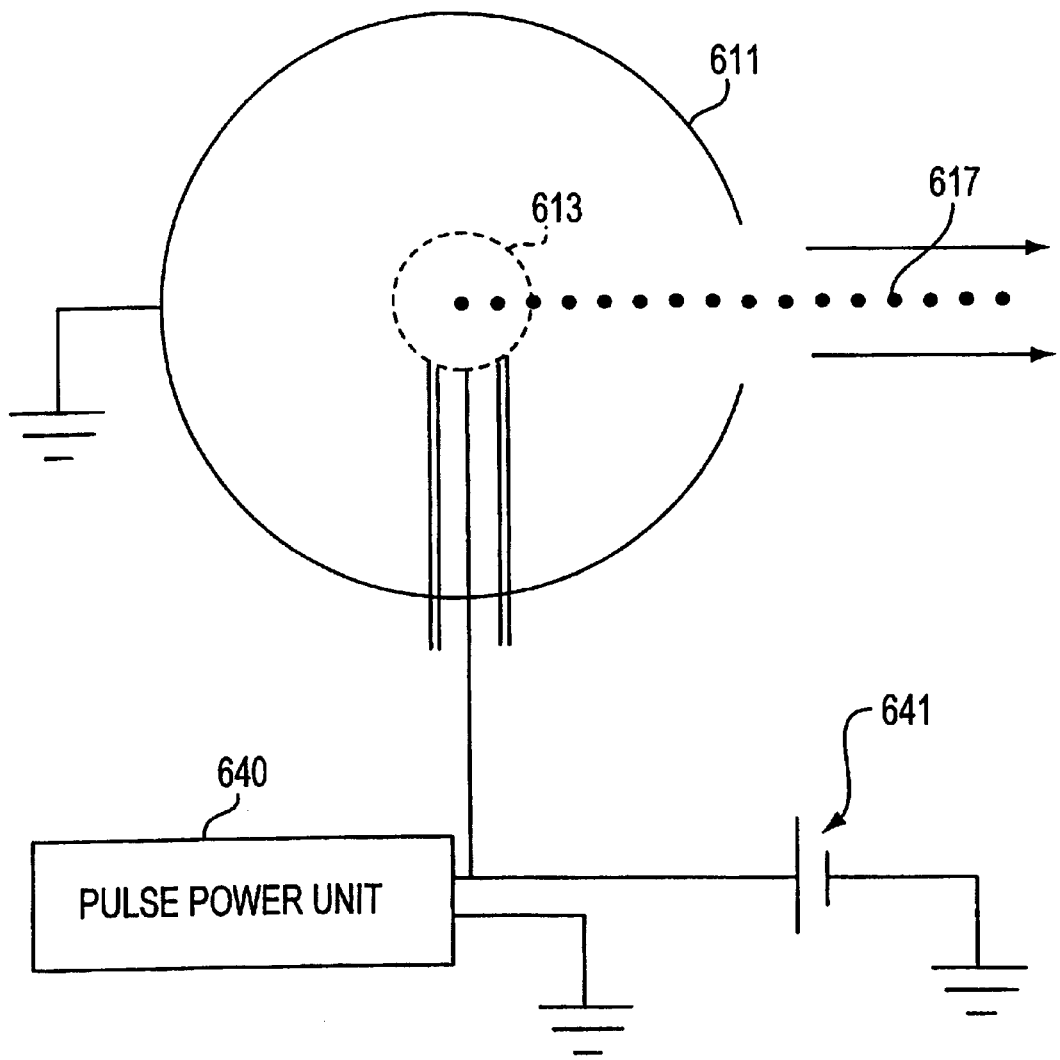
FIG. 9 is an illustration of the IEC jet device with a pulse power system to enhance and control its performance.

As previously noted, the IEC jet device may use a pulsed power supply 640 in parallel with a steady-state DC power supply 641, and such arrangement is shown in FIG. 9. The outer conductor 611 is connected to ground and the pulsed power supply 640 provides high voltage or high-current pulses to the cathode grid 613. Pulsing of the IEC device while operating in either "halo" or "star" modes has been publicly disclosed(Yibin Gu, George Miley, "Pulsed IEC Neutron Generator," $_{10}$th IEEE International Pulsed Power Conference, Albuquerque, N.M., Jul. 10–13 1995. pp. 3–5); however, the pulsing of the IEC device while operating in jet mode has not previously been disclosed and results in the generation of a pulsed plasma jet 617. The pulsed IEC plasma jet differs from pulsing the "halo" or "star" modes in that the minimum pulse length that must be used is a factor of 2 or more than that required for the "halo" or "star" modes, which typically need a minimum pulse length on the order of the ion bounce time, the time for the ion to circulate through the device. Conventional pulse power supplies using solid state or plasma switches may be used in this application.

Figure 10:
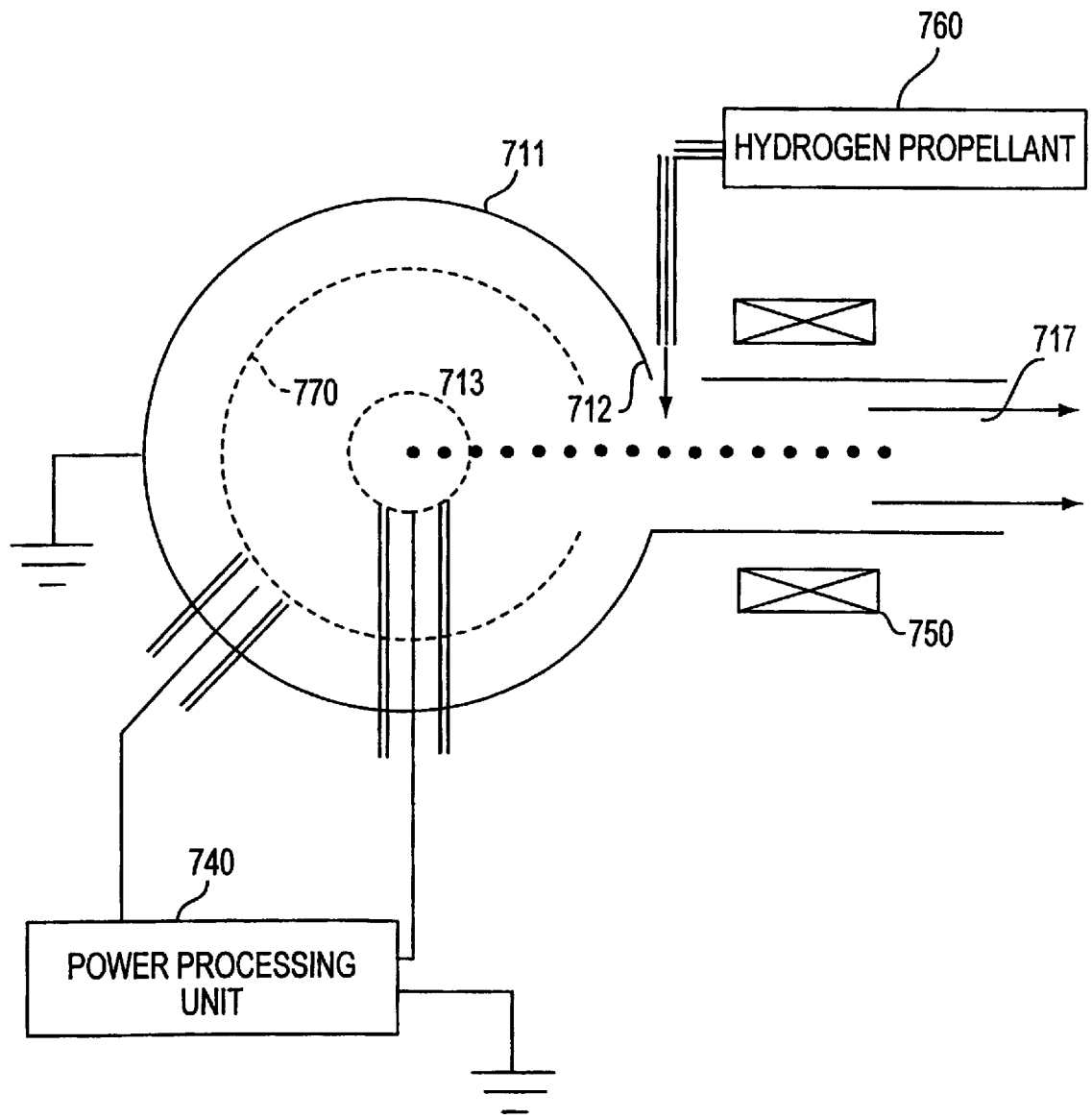
FIG. 10 is an illustration of an IEC fusion plasma jet thruster that uses deuterium and helium-3 as fusion fuel sources.

Another embodiment of the IEC plasma jet source having a grounded external confinement vessel 711 is one in FIG. 10 that uses fusion reactions created by the confinement of the IEC device to increase the power level of the plasma jet and to provide electrical power for keeping the thruster operating, thereby eliminating the need for an external power supply that derives its energy from photo-voltaic panels, or a nuclear fission power reactor. In the fusion-assisted mode of the plasma jet, deuterium and helium-3 fusion fuels are confined by the cathode grid 713 and subsequent virtual electrodes that form in the core of the IEC device. A plasma jet 717 of energetic fusion products escapes out a hole 712 in the IEC device and provides a high-power, high specific impulse jet. Energetic fusion products (protons and alpha particles) that don't escape out the hole are collected on floating spherical grids 770 within the IEC device chamber which build up high positive voltages. This system of collector grids 770 allows direct conversion of fusion energy into electrical energy. An external power processing unit 740 converts the high positive voltage (1 to 15 MV) electricity from the collector grids into a lower negative voltage (−10 to −100 kV), and this is fed back into the cathode grid to keep the device operating. In addition, the positively-biased collector grids 770 will act as electron guide grids to localize the ionization of the background neutral gas, and to accelerate fusion fuel ions (ionized deuterium and helium-3) back into the core of the IEC jet thruster device. To augment the thrust of the fusion plasma jet, hydrogen gas 760 is mixed in with the plasma jet exhaust 717, and external field magnets 750 can be used to help confine the mixed plasma jet exhaust if necessary. This fusion-assisted mode of operation of the IEC jet device is different from both Bussard's concept for an IEC fusion thruster ( Bussard et al., "Inertial Electrostatic Confinement as a Compact Fusion Power Source for Extraterrestrial Exploration", *NSTE-92—Nuclear Technologies for Space Exploration,* American Nuclear Society, La Grange Park, Ill., 614 (1992) ) that relies upon electron beam-heating of a hydrogen propellant, and from earlier concepts proposed by the University of Illinois (A. J. Satsangi, G. H. Miley et al., "Innovative Technology for an Inertial Electrostatic Confinement (IEC) Fusion Propulsion Unit", *Proceedings of the 11$^{th}$ Symposium on Space Nuclear Power and Propulsion,* Conf 940101, AIP Press, 1297–1302 (1994). ) in which a IEC fusion power device was used to produce electricity to run conventional electrical thrusters, such as arc-jets or planar electrostatic ion thrusters.

Figure 11:
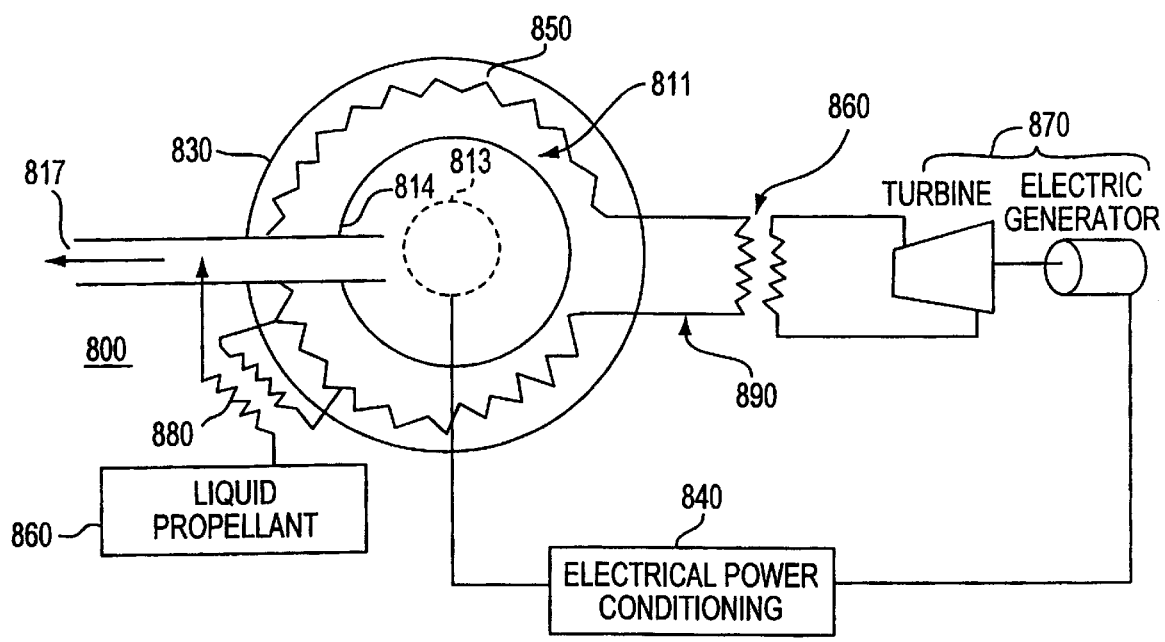
FIG. 11 is an illustration of an alternative embodiment of an IEC jet source.

FIG. 11 shows another embodiment of the IEC plasma jet source having a grounded external confinement vessel 811 that contains a grid 813 and produces a jet 817 through a hole 814 in the vessel 811 is one that uses fission reactions created by the flux of neutrons from an IEC device that uses fusion reactions to release the neutrons. The fusion neutrons resulting from the deuterium-deuterium or deuterium-tritium reactions will escape from the IEC containment vessel. A mantle of fissionable material 850 is arranged within a container 830 to substantially surround the IEC device. The preferred fissionable material is Thourium because it is considered to be a more acceptable fissionable material than uranium or plutonium isotope mixtures. The concept of the IEC neutron generator as a source of supplemental neutrons for the co-called sub-critical thourium reactor has been patented by H. H. Hora. The subcritical thorium reactor can be started after a successful delivery to Low Earth Orbit. The IEC device is first started by means of an electrical energy storage or solar photovoltaic or chemical gas generator and turbine system to generate a supplementary flux of neutrons that will sustain a fission chain reaction within the Thourium. The consequential heat of the thorium mantle is transferred to a thermal working fluid in a coolant loop system 840 using heat exchanger methods that are well known in the field of thermal systems engineering. The heat can be used to generate a gas phase such as steam that can drive a turbine generator 870 set to produce electricity. Suitable electric power conditioning equipment 890 that is well known in the electrical engineering field can be adapted to provide the driving power for the IEC fusion neutron generator and plasma jet combination. The sub-critical reactor heat may also be using in part to preheat rocket propellant for higher thrust augmentation. Such an embodiment presents a reduced set of demands on development effort because the Iec fusion reaction rate performance requirement is less than for a self sustained fusion power system and the IEC Jet propulsion would be a logical progression for a systemmatic development of a spaceflight qualified IEC supplemented sub-critical fission reactor electric power source. A propellant for thrust augmentation 860 can be supplied to the jet 817 in a manner previously discussed.

While the present invention has been described in connection with several preferred embodiments, the invention is not limited thereto, and its scope is to be defined by the following claims.

What is claimed:

1. Apparatus for generating a propulsive plasma jet comprising:
   a. a first conductive structure formed to operate as a gas containment vessel with a wall portion having at least a first opening to allow a plasma jet to escape from within said chamber and create a propulsive thrust;
   b. a second conductive structure formed as a grid within said first conductive structure and being highly transparent to flowing ions and electrons, said second conductive structure being operative to act like a cathode when biased to a negative voltage and having a second opening in said grid-type structure, said second opening being enlarged and operative to distort a local electrical potential surface such that a plasma jet flows out from inside the grid through said second opening;
   c. means for flowing at a controlled rate a neutral gas propellant into said gas containment vessel;
   d. a high-voltage feed-through insulator system which provides electrical power at a negative voltage from a power source to said cathode grid at a value sufficient to create a plasma discharge;
   e. said first opening in said first conductive structure being aligned with said second opening the said second conductive structure to allow plasma formed within said vessel to emerge from the vessel as a plasma jet having a power density and thrust;
   wherein said first conductive structure is biased at one of ground or a zero electrical voltage and said second conductive structure is biased to a negative potential.

2. The apparatus according to claim 1 further comprising:
   f. a third structure, being substantially cylindrical, transparent, grid-like and defined by a longitudinal axis, said third structure being attached proximate one end of said third structure along said axis to the surface of said second conductive structure with said longitudinal axis being orthogonal to a surface of said second conductive structure and aligned with a center of said first opening and a center of said second opening, said third structure being biased to the same voltage as said second conductive structure when acting as a cathode.

3. The apparatus according to claim 2 wherein said third structure extends out to the outer vacuum chamber wall of said first conductive structure, and said apparatus further comprises an insulator means for maintaining a voltage difference therebetween, said third structure being operative to suppresses the electrical potential along said longitudinal axis for providing a guide-channel for a plasma jet escaping from within said second conductive structure.

4. The apparatus according to claim 2 further comprising electron emitters disposed inside said vacuum chamber for providing a source of electrons, said external electron emitters being electrically insulated from said first conductive structure and said second conductive structure, said emitters being situated near said first opening outside of said first conductive structure to prevent negative charge build-up of a contained plasma.

5. The apparatus according to claim 2 further comprising a high voltage insulator means for maintaining the electric potential difference between the negatively-biased third structure and said first conductive structure.

6. The apparatus according to claim 5 wherein said insulator means is structured to cover said first conductive structure proximate said first opening and lines the inside of said first opening through which the plasma jet passes.

7. The apparatus according to claim 1 wherein said first conductive structure and said second conductive structure are substantially spherical and further comprising an intermediate spherical-shaped grid-like structure that lies between said first and second conductive structures, said intermediate grid-like structure being highly transparent to ion and electron flow and being biased to a voltage that is positive relative to the first conductive structure potential.

8. The apparatus according to claim 7 wherein said intermediate structure comprises an electron guide grid operative to increase the path length of emitted electrons, and enhance and localize the ionization rate of the background neutral gas into plasma, a portion of said electron guide grid having a third opening which is aligned with said first and second openings for passing the plasma jet.

9. The apparatus according to claim 7 wherein said intermediate conductive structure is a partial sphere which does not extend uniformly within the entire device.

10. The apparatus according to claim 8 wherein said high-voltage feed-through insulator system is operative to permit electrical power at a high negative voltage to be provided to said second conductive structure, and electrical power at a low positive voltage to be sent to said intermediate structure.

11. The apparatus according to claim 7 wherein said high-voltage, feed-through insulator system provides insulation at least from said first opening to said third opening.

12. The apparatus according to claim 7 wherein said electron emitters comprise electron dispensers that are disposed in a space between said first conductor structure and said intermediate grid-like structure.

13. The apparatus according to claim 1 wherein said neutral gas comprises at least one of xenon, argon, hydrogen, helium, higher hydrocarbons, nitrogen, tritium, helium-3 and deuterium.

14. The apparatus according to claim 1 wherein said plasma jet comprises at least one of microparticles and large molecules.

15. The apparatus according to claim 14 wherein said microparticles comprise fullerenes.

16. The apparatus according to claim 1 further comprising insulated support means for maintaining the relative positions of said first conductive structure, said second conductive structure and said third structure.

17. The apparatus according to claim 7 wherein said intermediate electron grid guide is biased positive in a range of 100 V to 1000 V.

18. The apparatus according to claim 7 which operates with said second conductive structure biased negative in a range of −0.1 Kv to −150 Kv.

19. The apparatus according to claim 1 which operates with an electrical current of 0.005 to 2.000 Amperes.

20. The apparatus according to claim 1 which operates with a neutral gas pressure between 0.1 and 20 mTorr.

21. The apparatus according to claim 1 which produces a single narrow plasma jet, wherein said first conductive structure comprises a spherical vacuum-type chamber having a diameter within a range of 25–35 cm, said second conductive structure comprises a spherical grid having a diameter within a range of 4–8 cm, said first opening comprising one of a circular or a polygonal hole and said third structure comprises polygonal grid elements.

22. The apparatus according to claim 1 wherein said first structure and said second structure are substantially spherical, wherein said apparatus produces a plurality of individual narrow plasma jets, wherein the vessel defined by said first conductive structure has a diameter within the range of 20–40 cm, the grid defined by said second conductive structure comprises a plural-ring electrical grid and said geometric transparency is greater than 95%.

23. The apparatus according to claim 1 wherein said second conductive structure comprises a grid having a spherical non-uniform design and said electric fields are distorted so that electrons are extracted and formed into a single plasma jet.

24. The apparatus according to claim 1 wherein said cathode grid has therein a core region which traps and re-circulates ions and electrons until they can escape through said first opening in the cathode grid due to associated electric field distortions in the region of said first opening.

25. The apparatus according to claim 1 wherein said apparatus is combined with a spacecraft and ejects matter as hot ionized or neutrally charged gas for spacecraft propulsion and maneuvering.

26. The apparatus according to claim 1 wherein said gas containment vessel is operable at internal pressures at least within a range of 0.1 to 0.01 mbar.

27. The apparatus according to claim 21 wherein said apparatus produces one dominant jet and a minor diametrically opposed jet, wherein said second conductive structure comprises N rings, M of said rings intersecting at the north and south poles of said sphere, the N-M rings being arranged to establish a recurring uniform pattern of triangular holes, said jet exiting via one of the largest holes, wherein N and M are integers and N is greater than M.

28. The apparatus according to claim 1 wherein said second structure are substantially elliptical, wherein said apparatus produces a plurality of individual narrow plasma jets, wherein the grid defined by said second conductive structure comprises a plural-ring electrical grid and said geometric transparency is greater than 95%.

29. The apparatus according to claim 1 wherein said apparatus produces one dominant jet and a minor diametrically opposed jet, wherein said second conductive structure comprises N rings, M of said rings intersecting at the north and south poles of said sphere, the N-M rings being arranged to establish a recurring uniform pattern of triangular holes, said jet exiting via one of the largest triangular holes, wherein N and M are integers and N is greater than M.

30. The apparatus according to claim 1 wherein said apparatus uses a pulsed power source in parallel with the steady-state direct current power supply during generation of a plasma jet.

31. The apparatus according to claim 1 wherein said apparatus comprises a pulsed power supply.

32. The apparatus according to claim 1 wherein said gas containment vessel is a vacuum chamber and said apparatus further comprises means operative to create fusion reactions for augmenting the performance of the plasma jet thruster.

33. The apparatus according to claim 32 further comprising means for confining fusion fuel ions with said cathode grid and multiple virtual electrodes for supporting fusion reactions.

34. The apparatus according to claim 32 wherein said apparatus comprises a hole in said gas confinement vessel to allow a jet of energetic charged fusion products to escape from the device and create a propulsive thrust.

35. The apparatus according to claim 32 wherein said apparatus further comprises a cylindrical extension means attached to the vacuum chamber through which a fusion plasma jet escapes, said means comprising a mixer means for combining at least one of hydrogen, nitrogen, hydrazine, ammonia, water or other propellants with the fusion plasma jet to create a high-thrust plasma jet.

36. The apparatus according to claim 35 wherein said apparatus further comprises external axial field magnetic means operative to create a magnetic nozzle to confine the mixed fusion product/ propellant plasma jet.

37. The apparatus according to claim 32 wherein said apparatus further comprises multiple spherical floating grids which are operative to collect high-energy, positively charged fusion products of protons and alpha particles from the fusion of deuterium and helium-3 isotopes.

38. The apparatus according to claim 37 wherein said apparatus develops a high positive voltage in the range of 1 to 20 megavolts, and is connected through a high-voltage feed-through apparatus to a power processing unit.

39. The apparatus according to claim 37 wherein said apparatus is connected to a power processing unit which converts the high positive voltage of the fusion product collector grids to a lower negative voltage in the range of −10 kV to −100 kV which is then fed back into the negative cathode grid.

40. The apparatus according of claim 37 wherein said apparatus comprises means for biasing to a high positive voltage due to fusion product positive ion implantation, said apparatus acting as an electron guide grid to confine electrons in a region about the grid and to enhance the localized ionization of the background neutral fusion fuel gases.

41. The apparatus according to claim 37 wherein said apparatus is operative to act as a positively-biased anode to accelerate fusion fuel ions into the core of the IEC jet device.

42. The apparatus according to claim 1 wherein said gas containment vessel is a vacuum chamber and said apparatus further comprises means operative to create fission reactions for augmenting the performance of the plasma jet thruster.

43. The apparatus of claim 42 wherein said means comprises a mantle of fissionable material.

44. The apparatus of claim 43 wherein said mantle substantially surrounds said first conductive structure.

45. The apparatus according to claim 1 further comprising an auxiliary propellant source for adding an auxiliary propellant to said plasma jet.

46. Apparatus for industrial application of a plasma jet, comprising one of producing a plasma spray, intense heating, and plasma vapor deposition, said apparatus comprising:

a. a first conductive structure formed to operate as a gas containment vessel with a wall portion having at least a first opening to allow a plasma jet to escape from within said chamber and create a propulsive thrust;

b. a second conductive structure formed as a grid within said first conductive structure and being highly transparent to flowing ions and electrons, said second conductive structure being operative to act like a cathode when biased to a negative voltage and having a second opening in said grid-type structure, said second opening being enlarged and operative to distort a local electrical potential surface such that a plasma jet flows out from inside the grid through said second opening;

c. means for flowing at a controlled rate a neutral gas propellant into said gas containment vessel;

d. a high-voltage feed-through insulator system which provides electrical power at a negative voltage from a power source to said cathode grid at a value sufficient to create a plasma discharge;

e. said first opening in said first conductive structure being aligned with said second opening the said second conductive structure to allow plasma formed within said vessel to emerge from the vessel as a plasma jet having a power density and thrust;

wherein said first conductive structure is biased at one of ground or a zero electrical voltage and said second conductive structure is biased to a negative potential.

47. The apparatus according to claim 46 wherein said plasma jet is applied to means adapted for at least one of plasma processing of materials, vapor film deposition, or intense plasma heating of a target.

48. The apparatus according to claim 46 wherein said apparatus of elements a.–d. comprise an IEC plasma jet producing device, said gas containment vessel comprises a vacuum chamber, and said apparatus further comprises an external vacuum chamber attached to said IEC vacuum chamber, said external vacuum chamber containing a plasma target and plasma processing equipment.

49. The apparatus according to claim 48 wherein said apparatus further comprises a table for securing at least one plasma target thereon.

50. The apparatus according to claim 48 wherein said apparatus comprises a conveyor means for securing and transporting plasma targets for exposure to said plasma jet.

51. The apparatus according to claim 48 where said apparatus further comprises plural valved access ports for inserting or removing plasma targets.

52. The apparatus according to claim 48 wherein said apparatus comprises at least one access port for visual or optical-microscopic inspections of the plasma target.

53. The apparatus according to claim 48 wherein said apparatus further comprises at least one access port for performing non-intrusive X-ray or gamma-ray diagnostic inspections of the plasma targets.

* * * * *